United States Patent [19]

Lochmann et al.

[11] 4,070,512
[45] Jan. 24, 1978

[54] MIXTURE CONTAINING AN ORGANOMETALLIC COMPOUND OF ALKALI METAL AND BEING STABILIZED TOWARDS EFFECTS OF ATMOSPHERE USEFUL FOR SURFACE ACTIVATION OF FLUOROCARBON POLYMERS

[75] Inventors: Lubomir Lochmann; Theodor Kremlicka; Josef Babka, all of Prague, Czechoslovakia

[73] Assignee: Ceskoslovenska akademie ved, Prague, Czechoslovakia

[21] Appl. No.: 642,389

[22] Filed: Dec. 19, 1975

[30] Foreign Application Priority Data

Dec. 29, 1974 Czechoslovakia .................... 9175/74

[51] Int. Cl.$^2$ ............................................. C09J 5/02
[52] U.S. Cl. ..................................... 427/445; 156/60; 260/30.4 R; 260/30.4 EP; 427/322
[58] Field of Search ...................... 260/30.4 R; 156/2; 427/322, 445

[56] References Cited

U.S. PATENT DOCUMENTS

3,440,088  4/1969  Yamada et al. .................. 106/271

*Primary Examiner*—Harry Wong, Jr.
*Assistant Examiner*—Peter F. Kulkosky

[57] ABSTRACT

The invention relates to a mixture for activation of polytetrafluoroethylene and other fluoroplastics for bonding by means of adhesives. The mixture contains an organometallic compound of an alkali metal stabilized against effects of atmospheric oxygen and humidity and is particularly suitable for the surface activation in a lot or continuous production or for spaceous articles, where the simple use without protective atmosphere is advantageous. It consists of 1-60 wt. % of an organic polymer (mol. wt. above 4000) obtained by polymerization of ethylene, $C_1$-$C_3$ alkyl, phenyl, or $C_1$-$C_{10}$ alkoxy substituted theylene, ethylene oxide or propylene oxide or a mixture of these polymers, 1 mol of Li, Na or K metal, 0.4–2 mol of a hydrocarbon containing 2–4 bonded, condensed or aneled aromatic nuclei, 500–5000 ml of a solvent from a group comprising aliphatic and cycloaliphatic ethers or polyethers, and, if it is required, up to 50 vol. % of an aromatic, aliphatic or cycloaliphatic hydrocarbon and/or up to 1 mol of the crown ether of the general formula

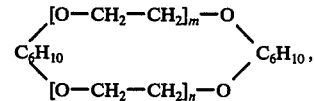

where $m + n = 2$ to 10. The surfaces treated with this mixture give virtually the same strength of bonding as after treatment with known organometallic agents, but under much more convenient condition of handling and application.

2 Claims, No Drawings

MIXTURE CONTAINING AN ORGANOMETALLIC COMPOUND OF ALKALI METAL AND BEING STABILIZED TOWARDS EFFECTS OF ATMOSPHERE USEFUL FOR SURFACE ACTIVATION OF FLUOROCARBON POLYMERS

An objective of the invention is a mixture containing an organometallic compound of alkali metal and being stabilized towards effects of atmosphere and application of this mixture in activation of the surface of polytetrafluoroethylene (Teflon) and of other fluorocarbon polymers.

Polytetrafluoroethylene (Teflon) and other fluoroplastics are noted for their valuable physico-chemical properties, namely for the resistance towards chemicals and relatively high temperatures, for extreme electroinsulation properties and for the low friction coefficient. They find broader and broader use on behalf of these advantages in spite of their relatively high price and difficult workability in comparison with other plastics. Joints of parts made of these materials and joints with parts made of other materials are particularly difficult to realize. The most common methods based on the elasticity of materials (e.g. bolted joints, pressed joints, and the like) cannot be used for so called "creep", i.e. for the large plastic deformations of most fluoroplastics under an external force. Fluoroplastics are weldable with hot air, however the temperature region of weldability is so narrow that a special complicated equipment is necessary which pays only in a large lot production. This is the reason why efforts are made for several years to joint fluoroplastics by sticking together. Since the known adhesives exhibit a low specific adhesion to fluoroplastics, the bonded surface needs to be activated. Another wide region for application of the surface-activated fluoroplastics, namely of polytetrafluoroethylene, is in the electrotechnical industry where, for example, polytetrafluoroethylene is more and more employed in the high-frequency technique for its electroinsulation properties. For the present, the best results have been achieved by activation with organometallic agents in an inert atmosphere.

One of the known activation methods for polytetrtafluoroethylene surfaces is based on application of the tetrahydrofuran solution of sodium naphthalene (U.S. Pat. No. 2,809,130 from 08.10. 1975), which allows to make activation of polytetrafluoroethylene in a suitable measure. However, this mixture is extremely sensitive towards atmosphere, reacts with oxygen and moisture within few seconds resulting in the complete loss of activity. This is the reason why the activation of polytetrafluoroethylene has to be carried out under a protective atmosphere. This again substantially limits applicability of the given method. It may be mainly used only for small articles and even in this case the handling of the activation mixture is very difficult. Another disadvantage of this mixture is the pyrophoricity of larger amounts in air which may cause fire or explosion in the case of damaged activation apparatus. Therefore another method was searched for the activation of the Teflon surface which would employ advantageous properties of organometallic agents under more acceptable conditions of handling. Such method was found by us and is described in this application of invention.

A substance of the submitted invention is a mixture which contains the organometallic compound of alkali metal stabilized towards the effects of air atmosphere and consists of 1 to 60 wt. % of an organic polymer of molecular weight at least 4000 which was obtained by polymerization of ethylene or ethylene substituted with at least one alkyl group containing 1 to 3 carbon atoms, phenyl, or alkoxy group with 1 to 10 carbon atoms in straight or branched chain, or a polymer obtained by polymerization of ethylene oxide or propylene oxide, or of a mixture of the mentioned polymers, 1 mol of alkali metal (lithium, sodium or potassium), 0.4 to 2 mol of a hydrocarbon containing 2 to 4 aromatic nuclei either directly bonded by the C—C bond or condensed or aneled, 500 to 5000 ml of an organic solvent or a mixture of solvents selected from a group comprising aliphatic or cycloaliphatic ethers, e.g. diethyl ether, tetrahydrofuran, or dimethyl ether of n-meric ethylene glycol, where $n = 1$ to 10, 0 to 50 vol. % of an aromatic, aliphatic, or cycloaliphatic hydrocarbon, e.g. toluene or heptane, and 0 to 1 mol of a macrocyclic polyether (crown-ether) of the general formula

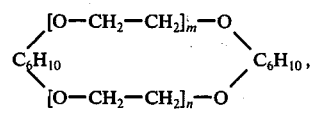

where $n + m = 2$ to 10, e.g. 2,3,11,12-dicyclohexyl-1,4,7,10,13,16-hexaoxacyclooctadecane, and their mixtures and application of this mixture in activation of surfaces of tetrafluoroethylene and other fluorocarbon polymers.

Activation of the polytetrafluoroethylene surface with this mixture is carried out very simply by a mere application on article in a sufficiently thick layer (about 1 mm) and allowing to act for the period required which is between 30 and 300 sec as a rule. No kind of protective atmosphere needs to be maintained during this activation since the decomposition of this mixture in air proceeds so slowly that the sufficient degree of activity remains even after several hours of contact with atmosphere. Also the pyrophoricity is removed in this way, so that the handling is substantially safer. The preparation of the activation mixture is very simple indeed, but it is prefered to carry it out under an protective atmosphere. The activation mixture prepared in this way is then stable in sealed containers at the temperature around 20° C even for several months. Its activity may be readily checked because it is intensively coloured in the active state and colorless or yellowish to brownish in the unactive state. The activation mixture may be also packed and stored in metallic tubes. This kind of packaging enables the very easy and, if it is required, also repeated application of the activation mixture, above all for individual applications or for smaller articles from fluoroplastics. However, the described activation mixture is very suitable also for lot or continuous production. Thus, the mixture may be advantageously used e.g. in activation of a fluoroplastics belt 30 cm wide in a continuous way using an extremely simple equipment. The consumption of the activation mixture is low in this case and mostly amounts to less than 50 g/m². Removal of residues of the activation mixture makes no problems. This may be done in the lot or continuous activation by washing with warm water containing a detergent and a small amount of an organic solvent, e.g. xylene, if it is needed. Smaller single articles are more advantageously washed after activation with organic solvents, as chloroform, xylene, toluene, etc.

Quality of the polytetrafluoroethylene surface activated with the mixture according to this invention was compared with that of the polytetrafluoroethylene surface treated by the known method with the tetrahydrofuran solution of sodium naphthalene in the argon atmosphere (according to U.S. Pat. No. 2,809,130) under further conditions being identical. The activated polytetrafluoroethylene surfaces were bonded with the adhesive CHS - Epoxy 15 using the curing catalyst B 8. Strength tests were carried out according to the Czechoslovak Standard CSN 668,510. The achieved shear strengths of the glued bonds were 42.6 kg/cm$_2$ at the known method of activation, and 43.8 kg/cm$_2$ using the activator according to this invention. As follows from comparison of found values, both activation methods provide virtually the same results, so that the method according to this invention allows to obtain the equivalent effect under the much more convenient conditions and also under circumstances when the original method cannot be used at all (e.g. for spacious articles).

EXAMPLE 1

An activation mixture was obtained under a protective atmosphere by interaction of 0.11 mol of sodium, 0.10 mol of naphthalene, 40 g of polyisobutylene (molecular weight about 45,000), 100 ml of dry tetrahydrofuran, and 5 g of dicyclohexyl-18-crown-6-ether. The prepared mixture was applied in the layer 1–2 mm thick onto a polytetrafluoroethylene surface with access of air and allowed to act for 5 minutes. The residues of the activation mixture were then removed and the obtained surface of polytetrafluoroethylene was suitable for bonding.

EXAMPLE 2

A mixture obtained similarly as in Example 1 by interaction of 0.11 mol of sodium, 0.10 mol of naphthalene, 25 g of polystyrene (molecular weight about 500,00) and 100 ml of dry tetrahydrofuran exhibited the similar properties in activation of the polytetrafluoroethylene surface.

EXAMPLE 3

A mixture obtained similarly as in Example 1 by interaction of 0.11 mol of sodium, 0.10 mol of naphthalene, 11 g of poly(vinyl isobutyl ether ) (K value 100–200) and 100 ml of tetrahydrofuran gave the similar results in bonding after action on the polytetrafluoroethylene surface.

EXAMPLE 4

A mixture obtained similary as in Example 1 by interaction of 0.11 mol of potassium, 0.10 mol of diphenyl, 25 g of polystyrene and 100 ml of dry tetrahydrofuran gave by action on the polytetrafluoroethylene surface the face suitable for bonding.

EXAMPLE 5

A mixture obtained similarly as in Example 1 by interaction of 0.11 mol of sodium, 0.10 ml of naphthalene, 11 g of poly(vinyl isobutyl ether), 50 ml of toluene and 50 ml of dry tetrahydrofuran gave by activation of polytetrafluoroethylene the surface suitable for bonding.

EXAMPLE 6

A mixture obtained similarly as in Example 1 by interaction of 0.11 mol of sodium, 0.10 mol of anthracene, 25 g of polystyrene and 100 ml of dry 1,2-dimethoxyethane gave in activation of polytetrafluoroethylene the surface suitable for bonding.

EXAMPLE 7

A mixture obtained similarly as in Example 1 by interaction of 0.11 mol of sodium, 0.10 mol of naphthalene, 13 g of polystyrene, 6 g of poly(vinyl isobutyl ether) and 100 ml of tetrahydrofuran gave in activation of polytetrafluoroethylene the surface suitable for bonding.

EXAMPLE 8

A mixture obtained similarly as in Example 2 gave in activation of polytrifluorochloroethylene the surface suitable for bonding with adhesives.

EXAMPLE 9.

A mixture prepared similarly as in Example 1 by interaction of 0.11 mol of sodium, 0.10 mol of naphthalene, 6 g of poly(vinyl isobutyl ether), 120 ml of dry diethyl ether, and 40 ml of dry tetrahydrofuran gave in activation of Teflon the surface suitable for bonding.

EXAMPLE 10

A mixture prepared similarly as in Example 1 by interaction of 0.11 mol of sodium, 0.10 mol of naphthalene, 30 g of polystyrene, 6 g of polyoxyethylene, 100 ml of dry tetrahydrofuran, 30 ml of dry toluene, and 2.5 ml of dry gasoline (b.p. 35°–90° C) gave in activation of Teflon the surface suitable for bonding.

We claim:

1. Mixture containing an organometallic compound of alkali metal and stabilized toward the effects of an air atmosphere, and consisting of 1 to 60 wt. % of an organic polymer of molecular weight of at least 4000 obtained by polymerization of ethylene or ethylene substituted with at least one alkyl group with 1 to 3 carbon atoms, phenyl, or an alkoxy group with 1 to 10 carbon atoms in the straight or branched chain, or a polymer obtained by polymerization of ethylene oxide or propylene oxide, or a mixture of the above mentioned polymers, the product of interaction of 1 mol of alkali metal selected from the group consisting of lithium, sodium and potassium and 0.4 to 2 mol of a hydrocarbon containing 2 to 4 aromatic nuclei, 500 to 5000 ml of an organic solvent or a mixture of solvents selected from the group comprising aliphatic or cycloaliphatic ethers, 0 to 50 wt. % of an aromatic, aliphatic or cycloaliphatic hydrocarbon, and 0 to 1 mol of the macrocyclic polyether (crown ether) of the general formula

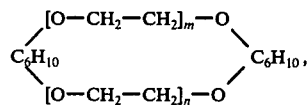

where $m + n = 2$ to 10.

2. The method for the activation of the surfaces of polytetrafluoroethylene and related fluorocarbon polymers in which the mixture of claim 1 is applied to such surfaces in a layer having a thickness of from 1 to 2 mm. for a minimum time of 30 seconds and in the absence of a protective atmosphere.

* * * * *